Nov. 19, 1963   D. C. KENNARD, JR., ETAL   3,111,074
EVACUATION CHAMBER

Filed Oct. 5, 1961   2 Sheets-Sheet 1

INVENTORS
DWIGHT C. KENNARD, JR.
CARL W. GERHARDT
BY
ATTORNEYS

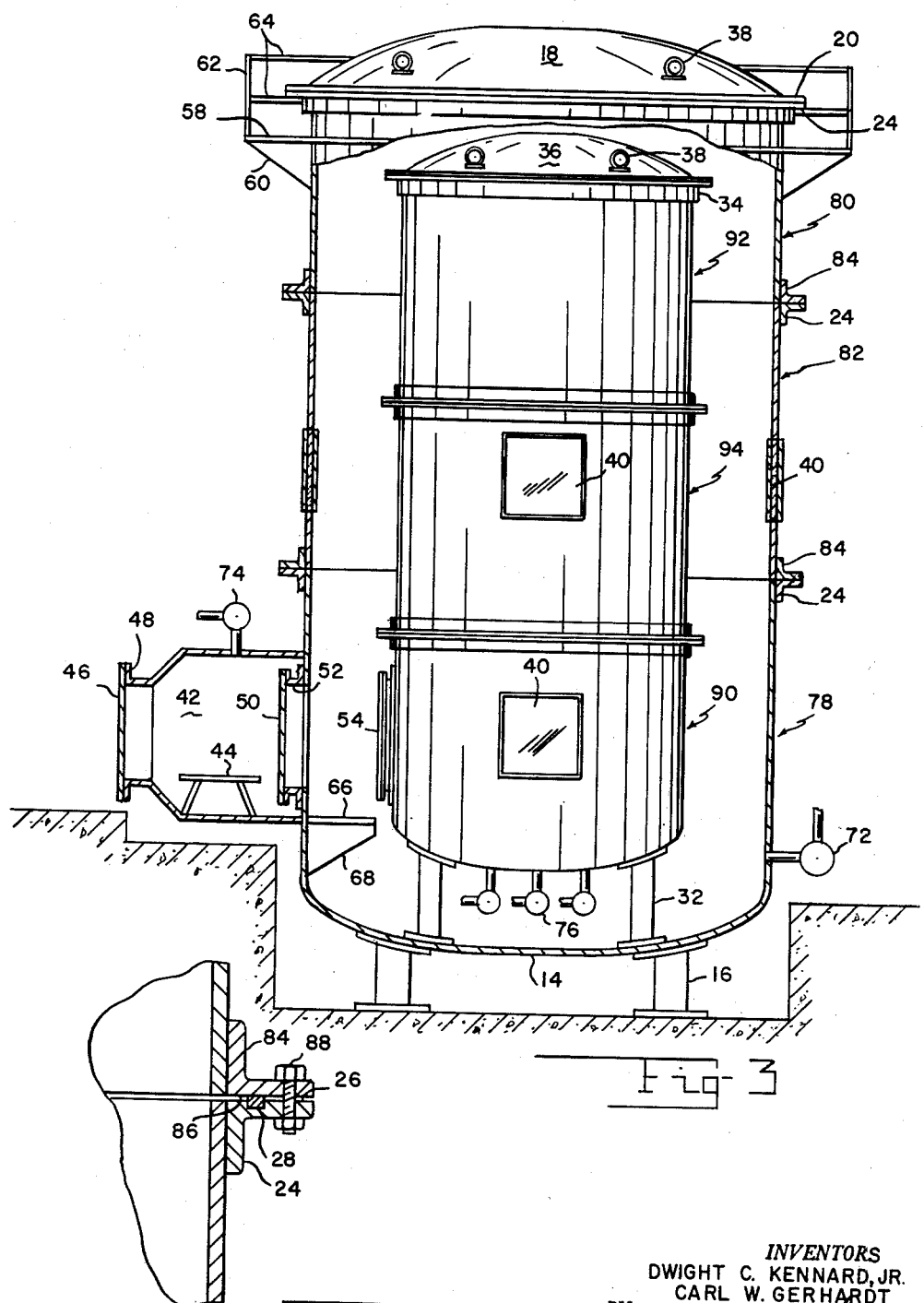

United States Patent Office 3,111,074
Patented Nov. 19, 1963

3,111,074
EVACUATION CHAMBER
Dwight C. Kennard, Jr., and Carl W. Gerhardt, both of Dayton, Ohio, assignors to the United States of America as represented by the Secretary of the Air Force
Filed Oct. 5, 1961, Ser. No. 143,252
5 Claims. (Cl. 98—29)
(Granted under Title 35, U.S. Code (1952), sec. 266)

The invention described herein may be manufactured and used by or for the United States Government for governmental purposes without payment to us of any royalty thereon.

This invention relates to chambers or vessels which may be evacuated to pressures below atmospheric pressure.

Vessels which may be evacuated to pressures below atmospheric pressure, in addition to being used by a large variety of process industries, are extensively used as altitude simulation chambers for the conduct of environmental testing of various components and hardware associated with the flight of aircraft and other space vehicles. Such vessels are also used for the conduct of medical research on the effect of high altitudes on personnel manning such space vehicles and for the testing of flight suits on such personnel.

Vessels of the type to which this invention relates, in addition to simulating altitudes, are often used to simulate other physical conditions such as temperature, solar radiation, infrared radiation, entry and re-entry effects, X-ray radiation and meteoritic bombardment.

Before the advent of missile flight, single shell vessels were suitable for simulating flight conditions up to altitudes at a maximum of 160,000 to 200,000 feet. However, to conduct satisfactory environmental testing at conditions encountered on missile flights, the test vessel must be evacuated to a pressure representing an altitude of say 2,000,000 feet. Such a pressure would be about $10^{-9}$ mm. Hg.

A large single shell vessel constructed with openings necessary to permit the passage of personnel and material and with observation windows, would present several serious disadvantages. These disadvantages include the extremely heavy metal which must be formed into shape, the problem of preventing leaks through necessary seals on a vessel with a large pressure differential, and the problem of a pumping system which can, in a single step, evacuate a large vessel to an extremely low pressure.

One object of this invention is to provide a multi-shell vessel for evacuation in increments to extremely low pressure.

Another object of this invention is to provide an effective structure which may be fabricated at lower cost by use of lighter weight materials.

Still another object of this invention is to provide a multi-shell structure in which the rarified air space surrounding the inner shell acts as an insulating medium permitting a more rapid and efficient heating or cooling of the inner vessel.

Yet another object of this invention is to provide a multi-shell structure having less tendency to leak at seals and joints by providing an intermediate pressure between the shells.

A further object of this invention is to provide a multi-shell structure having a fixed outer structure and an interchangeable inner structure adapted for the conduct of various tests.

A still further object of this invention is to provide a multi-shell structure having interchangeable heads and a personnel lock or entrance portal.

While the invention to be shown and described is for convenience in regard to an altitude chamber, it is to be understood that it is not our intent and purpose to limit our invention to such use. Accordingly, additional objects, advantages and features of the invention reside in the construction, arrangement and combination of parts involved in the embodiment of the invention as will appear from the following description and accompanying drawings wherein:

FIG. 3 is a vertical view, partially in section of another embodiment of the invention; and FIG. 4 is an enlarged sectional detail showing a method for sealing and joining annular sections.

Figures 1, 2:
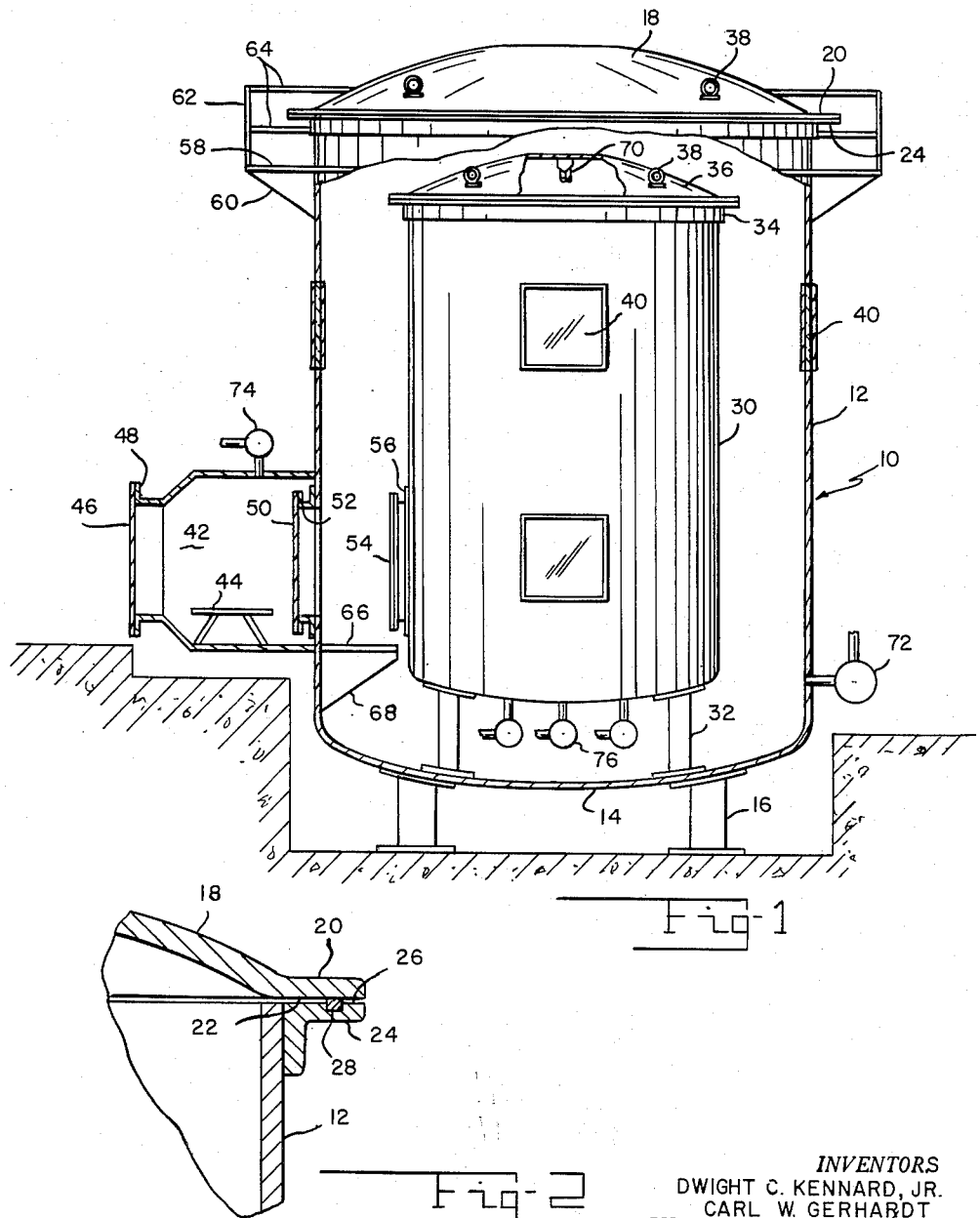
FIG. 1 is a vertical view, partially in section of one embodiment of the invention.
FIG. 2 is an enlarged sectional detail showing a typical seal.

Referring to FIG. 1, the evacuation chamber or vessel 10 has an outer cylindrical shell 12 with an integral dished bottom 14. The outer cylindrical shell 12 is mounted in a suitable pit in a reinforced concrete floor by means of a plurality of legs 16 which, for convenience, may be welded to the dished bottom 14 at one end and attached to the pit floor by means of anchor bolts embedded within the concrete in a manner well known to the art.

The upper open end of outer shell 12 is closed by a removable dished head 18 constructed in a manner well known to the art and terminating in circumferential flange 20, the face 22 of which is machined to a smooth and plane surface. An annular flange ring 24, which is formed of angle iron, is continuous welded to the outer periphery of shell 12 in such axial location that, after machining the face 26 to a smooth and plane surface, this machined face of ring 24 will coincide with the free end of shell 12 as shown on FIG. 2.

As shown on FIG. 2, a circular counterbore is machined into face 26 of ring 24 for receiving a gasket or seal 28. It has been found from experience that a suitable seal may take the form of an annular ring made of annealed copper. If desired, head 18 may be bolted to the flanged ring 24. Experience, however, has shown such bolting to be unnecessary because, as the vessel is further and further evacuated, outside pressure will hold the head against the seal with ever increasing force.

An inner cylindrical shell 30 of similar configuration to outer shell 12, but of lighter construction, is placed within shell 12 as shown on FIG. 1. The inner shell may be supported by suitable legs 32, and if so desired, may be made to permit the inner shell 30 to be easily withdrawn and replaced with a similar shell modified for the conduct of different tests.

A flange ring 34, similar to flange ring 24, previously described, is continuous welded to the outer periphery of inner shell 30 and is machined and counterbored for a seal in the same manner as is flange ring 24. A dished head 36 of configuration similar to dished head 18 but of lighter construction is placed over the open end of the shell 30.

A plurality of eye bolts 38 are welded to the heads 18 and 36. Wire ropes may be attached to the eye bolts to provide a sling for removing and replacing the dished heads by means of an overhead crane, not shown.

A plurality of windows or transparent panes 40 made of plate glass, Plexiglas or other suitable transparent material may be built and sealed into the shells. The windows permit observation from the outside of the chamber and may also be used to permit photography of events within the inner shell during conduct of tests.

An entrance portal 42 is continuous welded to the outer shell 12. This portal may be constructed in any convenient form and is large enough to accommodate about four people who may sit on benches 44 which are welded to opposite sides within the portal.

An entrance door 46 is hinged in the customary manner to the opening frame 48 of portal 42. A similar door 50 is hinged to frame 52 which is continuous welded around an opening in outer shell 12. Another door 54 is hinged to frame 56 which is continuous welded around a like opening in inner shell 30. Frames 48, 52, and 56 may be machined and counterbored to receive gaskets much in the manner as illustrated by FIG. 2. The gaskets may be of neoprene or other suitable material. As with heads 18 and 36, no means are required to hold the doors closed, since they are held closed by means of differential pressure when the structure is being evacuated. If desired, stiffening ribs to prevent distortion from pressure differential may be welded to the doors.

As shown on FIG. 1, a catwalk is built around the outer shell. This catwalk consists of a circular platform 58 preferably made with a nonskid tread and supported by gussets 60 which are welded in place. A plurality of vertical pipes 62 joined to platform 58, and pipes or tubes 64 formed into circles and joined to the vertical pipes 62, form a convenient handrail and safety wall to prevent personnel from accidentally falling from the catwalk.

Within outer shell 12, a platform 66 is welded to the inner wall and is supported by gussets 68 also welded in place. The platform is at such height as will facilitate the passage of personnel and material between shells.

The altitude chamber, as depicted, is used to conduct tests at simulated high altitude and with the test specimen exposed to simulated solar energy. A plasma jet 70 is mounted within dished head 36 and creates the simulated solar energy. The mounting means within head 36 may be universal to accommodate various equipment which may be used to create environmental conditions or, as an alternative, various interchangeable heads may be used, each head supporting different equipment.

The complete structure as shown in FIG. 1 is evacuated in two stages. The inner shell is evacuated to a pressure representing say 2,000,000 feet altitude and the area between the inner shell and outer shell is evacuated to a pressure representing say 160,000 to 200,000 feet altitude. A vacuum pump 72 is used to evacuate the outer shell to the intermediate pressure and discharges into the atmosphere. A similar vacuum pump 74 in like manner evacuates the entrance portal 42. A plurality of pumps 76 such as oil diffusion pumps equipped with $N_2$ cryogenic baffles may be used to reduce the pressure within the inner shell to the required pressure and discharge into the area between the inner and outer shells. Pumps 76, depending upon type and construction, may operate in parallel or in series.

The structure may be instrumented as required and may be heated or cooled in manners well known to the art and constituting no part of this invention.

The entrance portal has several useful functions including (1) a means for allowing the passage of personnel and material during the course of a test without raising the pressure within the structure to atmospheric, (2) safety personnel may be kept within the portal who can more rapidly enter the inner shell and (3) the portal may be used as an intermediate conditioning chamber for personnel entering or leaving the inner shell.

Bulky and heavy equipment may be moved to and from the chamber when the heads are removed.

The embodiment of the invention depicted by FIG. 3 is functionally the same as the embodiment depicted by FIG. 1. The difference is in the construction of the shells which are made in sections for inherent advantages including: (1) the height of the chamber may be raised or lowered to meet the requirements of changing conditions and (2) the shorter the chamber, the shorter the time required to evacuate to a given low pressure.

The outer shell consists of a base section 78, an annular dome section 80 and one or more optional annular sections 82 of a configuration as annular section 80. Flange rings 24, machined as previously described, are continuous welded and located as shown on FIG. 3. Flange rings 84 formed of like angle iron as flange rings 24 are continuous welded and located as shown on FIG. 3. The face 86 of flange ring 84 is machined to a smooth and plane surface. Each section of the shell is joined to the adjacent section by a plurality of bolts 88 as shown by FIG. 3 in a manner well known to the art.

In like manner, the inner shell may have a base section 90, an annular dome section 92 and one or more optional annular sections 94 of a configuration as annular section 92. The sections may be joined with flange rings similar to flange rings 24 and 84 previously described.

The chamber may be constructed to be of minimum height when no annular sections are used.

While a preferred form of the invention has been shown and described, various modifications and substitutions of equivalents will occur to those skilled in the art after a study of the foregoing disclosure. Hence, the disclosure should be taken in an illustrative rather than in a limiting sense and it is the desire and intention to reserve all modifications within the scope of the subjoined claims.

We claim:

1. An evacuation chamber comprising: an outer vessel having a cylindrical shell with dished bottom and a removable dished head, an inner vessel having a cylindrical shell with dished bottom and a removable dished head, said inner vessel being supported within said outer vessel, an entrance portal joined to said outer vessel, said entrance portal being adapted for passage into said outer vessel, means for passage into said inner vessel from said outer vessel, openable means closing entrance to said entrance portal, openable means closing passage between said entrance portal and said outer vessel, openable means closing said passage means into said inner vessel, transparent panes on said outer and said inner vessels, said panes being in alignment and adapted for viewing the interior of said inner vessel from outside the chamber, means for evacuating said inner chamber to a pressure below atmospheric pressure, means for evacuating the area between said inner vessel and said outer vessel to a pressure below atmospheric and means for evacuating said entrance portal to a pressure below atmospheric pressure.

2. An evacuation chamber comprising: an outer vessel having a cylindrical shell with dished bottom and a removable dished head, an inner vessel having a cylindrical shell with dished bottom and a removable dished head, said inner vessel being supported within said outer vessel, an entrance portal joined to said outer vessel, said entrance portal being adapted for passage into said outer vessel, means for passage into said inner vessel from said outer vessel, openable means closing entrance to said entrance portal, openable means closing said passage between said entrance portal and said outer vessel, openable means closing said passage means into said inner vessel, transparent panes on said outer and said inner vessels, said panes being in alignment and adapted for viewing the interior of said inner vessel from outside the chamber, means for evacuating said inner vessel to a pressure below atmospheric pressure, said evacuating means being installed within said outer vessel and adapted to discharge into said outer vessel, means for evacuating the area between said inner vessel and said outer vessel to a pressure intermediate to the pressure within said inner vessel and the atmosphere and means for evacuating said entrance portal to a pressure below atmospheric pressure.

3. A multi-shell vessel comprising: an outer vessel, an inner vessel, means for evacuating said inner vessel to a pressure below atmospheric pressure and means for evacuating said outer vessel to a pressure below atmospheric pressure; said outer vessel comprising a base section, a removable head and at least one annular section removably joined between said base section and said head; said inner vessel comprising a base section; a removable head, and at least one annular section removably joined between said base section and said head.

4. An evacuation chamber comprising: an outer vessel, an inner vessel, means for evacuating said inner vessel to a pressure below atmospheric pressure, means for evacuating the area between said inner vessel and said outer vessel to some pressure intermediate between the pressure in said inner vessel and atmospheric pressure; said outer vessel comprising a base section, a removable head, and at least one annular section removably joined between said base section and said head; said inner vessel comprising a base section, a removable head, and at least one annular section removably joined between said base section and said head; an entrance portal joined to said outer vessel, said entrance portal being adapted for passage into said outer vessel, means for passage into said inner vessel from said outer vessel, openable means closing entrance to said entrance portal, openable means closing said passage between said entrance portal and said outer vessel, and openable means closing said passage means into said inner vessel.

5. An evacuation chamber comprising: an outer vessel, an inner vessel, said inner vessel being supported within said outer vessel, means for evacuating said inner vessel to a pressure below atmospheric pressure, said evacuating means being installed within said outer vessel and adapted to discharge into said outer vessel, means for evacuating the area between said inner vessel and said outer vessel to a pressure intermediate to the pressure within said inner vessel and the atmosphere, said outer vessel comprising a base section, a removable head, and at least one annular section removably joined between said base section and said head; said inner vessel comprising a base section, a removable head, and at least one annular section removably joined between said base section and said head; an entrance portal joined to said outer vessel, said entrance portal being adapted for passage into said outer vessel, means for evacuating said entrance portal to some pressure below atmospheric pressure, means for passage into said inner vessel from said outer vessel, openable means closing entrance to said entrance portal, openable means closing said passage between said entrance portal and said outer vessel, openable means closing said passage means into said inner vessel, and transparent panes on said outer and said inner vessels, said panes being in alignment and adapted for viewing the interior of said inner vessel from outside the chamber.

References Cited in the file of this patent

UNITED STATES PATENTS

| | | |
|---|---|---|
| 2,373,333 | Onge | Apr. 10, 1945 |
| 2,482,770 | Heineman | Sept. 27, 1949 |
| 2,550,040 | Clar | Apr. 24, 1951 |
| 2,917,987 | Hansen | Dec. 22, 1959 |
| 3,018,561 | Wells | Jan. 30, 1962 |